(12) United States Patent
Yao et al.

(10) Patent No.: US 11,895,601 B2
(45) Date of Patent: Feb. 6, 2024

(54) MULTI-BEAM POWER CONTROL METHODS AND SYSTEMS

(71) Applicant: ZTE Corporation, Guangdong (CN)

(72) Inventors: Ke Yao, Guangdong (CN); Bo Gao, Guangdong (CN); Yu Ngok Li, Guangdong (CN); Zhaohua Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 245 days.

(21) Appl. No.: 17/246,302

(22) Filed: Apr. 30, 2021

(65) Prior Publication Data

US 2021/0258894 A1    Aug. 19, 2021

Related U.S. Application Data

(63) Continuation of application No. PCT/CN2018/113832, filed on Nov. 2, 2018.

(51) Int. Cl.
*H04W 52/36* (2009.01)
*H04W 52/42* (2009.01)
(Continued)

(52) U.S. Cl.
CPC .......... *H04W 52/42* (2013.01); *H04W 52/08* (2013.01); *H04W 52/10* (2013.01);
(Continued)

(58) Field of Classification Search
CPC ..... H04W 52/04; H04W 52/10; H04W 52/08; H04W 76/27; H04W 52/32; H04W 52/34;
(Continued)

(56) References Cited

U.S. PATENT DOCUMENTS

2013/0083739 A1   4/2013   Yamada
2018/0279229 A1   9/2018   Dinan et al.
(Continued)

FOREIGN PATENT DOCUMENTS

CN   108134659 A   6/2018
CN   108135028 A   6/2018
(Continued)

OTHER PUBLICATIONS

Extended European Search Report dated May 17, 2022 for European Patent Application 18930163.3 (11 pages).
ZTE, "Maintenance for UL power control", 3GPP TSG RAN WG1 Meeting #94bis, Chengdu, China, R1-1810217, Oct. 8-12, 2018 (6 pages).
Interdigital, "Corrections on CFRA BFR termination", 3GPP TSG-RAN WG2 Meeting #103bis, Chengdu, People's Republic of China, R2-1815643, Oct. 8-12, 2018 (6 pages).
(Continued)

*Primary Examiner* — Tu X Nguyen
(74) *Attorney, Agent, or Firm* — Perkins Coie LLP

(57) ABSTRACT

Methods, systems, and devices for multi-beam power control and detecting link recovery confirmation information are described. An exemplary method for wireless communication includes determining an association between a set of parameters and a plurality of beams; and performing, by a terminal and based on the association, one or more uplink transmissions, where the set of parameters comprises at least one of the following parameters: one or more open loop parameters, one or more closed loop parameters, one or more transmit power control (TPC) commands or one or more path loss reference signal (PL-RS) parameters.

12 Claims, 9 Drawing Sheets

(51) Int. Cl.
*H04W 52/08* (2009.01)
*H04W 52/10* (2009.01)
*H04W 52/24* (2009.01)
*H04W 72/044* (2023.01)
*H04W 72/23* (2023.01)

(52) U.S. Cl.
CPC ......... *H04W 52/242* (2013.01); *H04W 52/36* (2013.01); *H04W 72/046* (2013.01); *H04W 72/23* (2023.01)

(58) Field of Classification Search
CPC ..... H04W 52/54; H04W 52/58; H04W 52/18; H04W 52/06; H04W 80/06; H04W 52/36
See application file for complete search history.

(56) References Cited

U.S. PATENT DOCUMENTS

| | | | |
|---|---|---|---|
| 2020/0119799 A1* | 4/2020 | Jung | .................... H04W 52/36 |
| 2020/0322893 A1 | 10/2020 | Yao et al. | |
| 2020/0413345 A1 | 12/2020 | Yao et al. | |

FOREIGN PATENT DOCUMENTS

| | | |
|---|---|---|
| WO | 2017000665 A1 | 1/2017 |
| WO | 2018083536 A1 | 5/2018 |

OTHER PUBLICATIONS

AT&T, "On DCI contents and formats", 3GPP TSG RAN WG1 Meeting 91, Reno, USA, R1-1719643, Nov. 27-Dec. 1, 2017 (9 pages).
Anoymous, "3rd Generation Partnership Project; Technical Specification Group Radio Access, Network; NR; Physical layer procedures for control (Release 15)", 3GPP TS 38.213, V 15.3.0, Sep. 2018 (101 pages).
International Search Report and Written Opinion in International Application No. PCT/CN2018/113832, dated Jul. 25, 2019, 9 pages.
KIPO, Office Action for Korean Patent Application No. 10-2021-7016441, dated Dec. 5, 2022, 7 pages with unofficial translation.
JPO, Final Office Action for Japanese Application No. 2021-524011, dated May 24, 2023, 6 pages with unofficial English translation.
EPO, Communication pursuant to Article 94(3) EPC for European Application No. 18930163.3, dated Jun. 27, 2023, 7 pages.
NTT Docomo, Inc., "Discussion on 4-step random access procedure for NR," 3GPP TSG RAN WG1 #89, R1-1708443, Hangzhou, China, May 15-19, 2017, 7 pages.
KIPO, Office Action for Korean Application No. 10-2021-7016441, dated Jun. 29, 2023, 9 pages with unofficial translation.
CNIPA, First Office Action for Chinese Application No. 202210060474X, dated Sep. 28, 2023, 15 pages with unofficial translation.

* cited by examiner

MULTI-BEAM POWER CONTROL METHODS AND SYSTEMS

CROSS-REFERENCE TO RELATED APPLICATIONS

This application is a continuation of International Patent Application No. PCT/CN2018/113832, filed on Nov. 2, 2018, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring power control of multiple beams at user equipment and network nodes.

SUMMARY

This document relates to methods, systems, and devices for multi-beam power control in mobile technology communication systems, e.g. Long Term Evolution (LTE), 5th Generation (5G) and New Radio (NR) networks.

In one exemplary aspect, a wireless communication method is disclosed. The method includes determining an association between a set of parameters and a plurality of beams; and performing, by a terminal and based on the association, one or more uplink transmissions, where the set of parameters comprises at least one of the following parameters: one or more open loop parameters, one or more closed loop parameters, one or more transmit power control (TPC) commands or one or more path loss reference signal (PL-RS) parameters In another exemplary aspect, a wireless communication method is disclosed. The method includes determining, by a network node and for a terminal, an association between a set of parameters and a plurality of beams and transmitting, to the terminal, a message indicative of the association. The set of parameters comprises at least one of an open loop parameter, a closed loop parameter, a transmit power control (TPC) command or a path loss reference signal (PL-RS) parameter.

In yet another exemplary aspect, a wireless communication method is disclosed. The method includes detecting a link recovery confirmation information and initializing, subsequent to the detecting, a closed loop power control of an outbound channel transmission to a zero value, a ramp-up power, a transmit power control (TPC) power offset, or a sum of the ramp-up power and the TPC power offset.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

A new generation of wireless communication technology, e.g. New Radio (NR), is being developed. As a fifth-generation mobile communication system, this technology needs to support various application scenarios in both the traditional low frequency band and the high frequency band, so beam mode communication (or beamforming) is one of the main features of the NR system.

Beamforming is an effective means to improve transmission distance and avoid interference in high-band communication. The beam has directionality and width. In order to cover different directions, usually multiple antennas are configured at the transmitting end and the receiving end to form beams in multiple directions.

The multiple antennas of the wireless communication node can be divided into different groups, each group is called an antenna panel (or referred to as a panel). The UE can generally support multiple antenna panels, covering different directions respectively. Different antenna panels can generally transmit beams simultaneously. One to multiple beams can be sent simultaneously on each panel. The number of beams that can be simultaneously transmitted on each panel is less than the maximum number of beams that the panel can support.

At present, the related technologies already support the basic multi-beam power control mechanism, but there are still deficiencies for existing implementations with multiple panels and multiple transmission points (TRPs). For example, flexible power allocation between multiple beams cannot be achieved when multiple beams are used to simultaneously transmit uplink transmissions. This requirement is necessary for the application of multiple panels and multiple TRPs, such as when different uplinks transmitted by different beams arrive at different TRPs of the base station and where the interference levels of each TRP vary greatly. Existing schemes can only support an equal distribution of power to each transmit beam, which limits the application of multiple panels and multiple TRPs.

Figure 1:
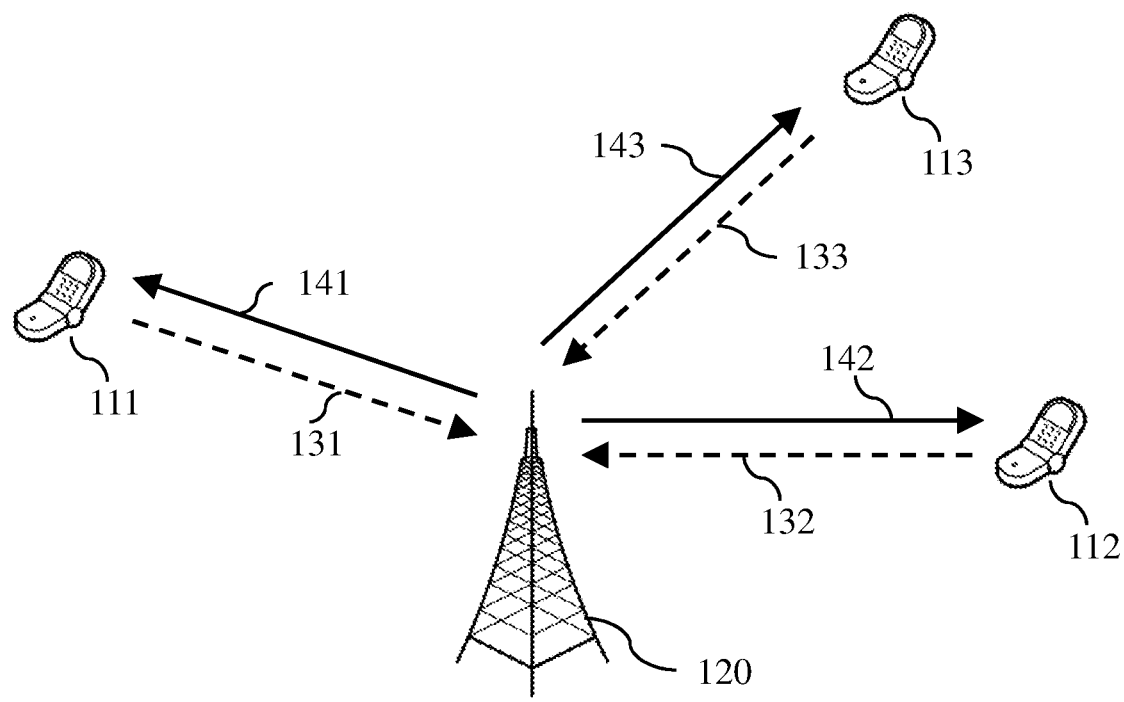
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. In some embodiments, the BS transmits an indication of power scaling (141, 142, 143) to the UEs, which scale the powers of multiple transmission beams for subsequent communications (131, 132, 133). The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Overview of the Disclosed Technology

The base station configures the power control parameters of the uplink transmission for the UE, and the description is as follows:

1) In some embodiments, the base station configures J sets of open loop power control parameters for the UE, and each set of open loop power control parameters includes at least one of the following: target received power P0, path loss compensation factor $\alpha$, where J is an integer greater than or equal to 1, each set of open loop power control parameters is identified by an integer j, and $0 \leq j < J$.

2) In some embodiments, the base station configures K sets of path loss measurement parameters for the UE, and each set of path loss measurement parameters includes at least one of the following: at least one reference signal RS resource type indication for path loss measurement and reference signal RS resource indication for path loss measurement, where K is an integer greater than or equal to 1, each set of path loss measurement parameters is identified by an integer k, and $0 \leq k < K$.

The path loss measurement parameter is also written as the PL-RS parameter, which is an indication of the reference signal RS used to estimate the pathloss, and may include at least one of the following: CRI-RS indication or SSB indication.

3) In some embodiments, the base station configures L sets of closed-loop power control parameters for the UE, and each set of closed-loop power control parameters includes at least one of the following: a closed-loop power control identifier and a closed-loop power control quantity, where L is an integer greater than or equal to 1, each set of closed-loop power control parameters is identified by an integer l, and $0 \leq l < L$.

The uplink transmission includes at least one of the following: PUSCH transmission, PUCCH transmission.

In some embodiments, the base station configures at least one SRS resource set for the UE, and each SRS resource set includes at least one SRS resource. Each SRS resource indicates resources occupied by the SRS, including time domain, frequency domain, code domain, and airspace (or spatial domain).

The base station configures an association relationship between at least one SRI value of the PUSCH and the foregoing power control parameter. For example, when SRI=0, j=0, k=1, l=0 or when SRI=1, j=1, k=1, l=0. Herein, the value of each SRI represents at least one SRS resource. When the base station uses the DCI to schedule PUSCH transmission, the SRI (SRS resource indicator) field is used to describe the spatial parameters of the PUSCH, e.g., spatial relationship information, SRS port, and the like.

The present document uses composite beam SRI to refer to the SRI indicating multiple beams, and single beam SRI to refer to the SRI indicating a single beam.

For a specific PUSCH transmission, the power control parameters of the PUSCH transmission can be obtained by looking up the association relationship between the SRI value and the power control parameter using the SRI field in the scheduling information.

In some embodiments, the base station configures at least one spatial relationship of the PUCCH, and configures an association relationship between the spatial relationship and the power control parameter. For example, j=0, k=1, l=0 are configured for spatial relationship 1, and j=1, k=1, l=0 are configured for spatial relationship 2. The base station may activate the spatial relationship through the MAC CE. The PUCCH transmission obtains the power control parameter of the PUCCH transmission by using the currently activated spatial relationship to check the relationship between the spatial relationship and the power control parameter. Furthermore, the spatial relationship may be indicated by an uplink reference signal, and/or a downlink reference signal.

The reference signal indication is a reference signal resource indication. For example, the reference signal includes at least one of the following: SRS (sounding reference), CSI-RS (channel status information-reference signal), SSB (Synchronization signal Block). SSB also refers to SS/PBCH block which consists of PSS, SSS, PBCH and DM-RS for PBCH.

The above closed-loop power control parameter refers to the number of closed-loop power control. For example, if the number of closed-loop power control is 2, two closed-loop power control processes of l=0 and l=1 are supported. The closed-loop power control process is indicated as closed-loop power control index, and can also be written as closed-loop power control loop, or closed-loop power control.

Each upstream transmission has a specific closed loop power control index. The base station determines the power offset that needs to be adjusted by the UE according to the difference between the measured result of the historical uplink transmission and the target, and notifies the UE by transmitting a power control command, e.g. a Transmit Power Control (TPC) Command for the PUSCH and for the PUCCH in the DCI. The UE maintains a local power adjustment amount f(l) for each closed loop power control identifier, and updates according to the TPC command to achieve the purpose of closed loop control power.

Figure 2:
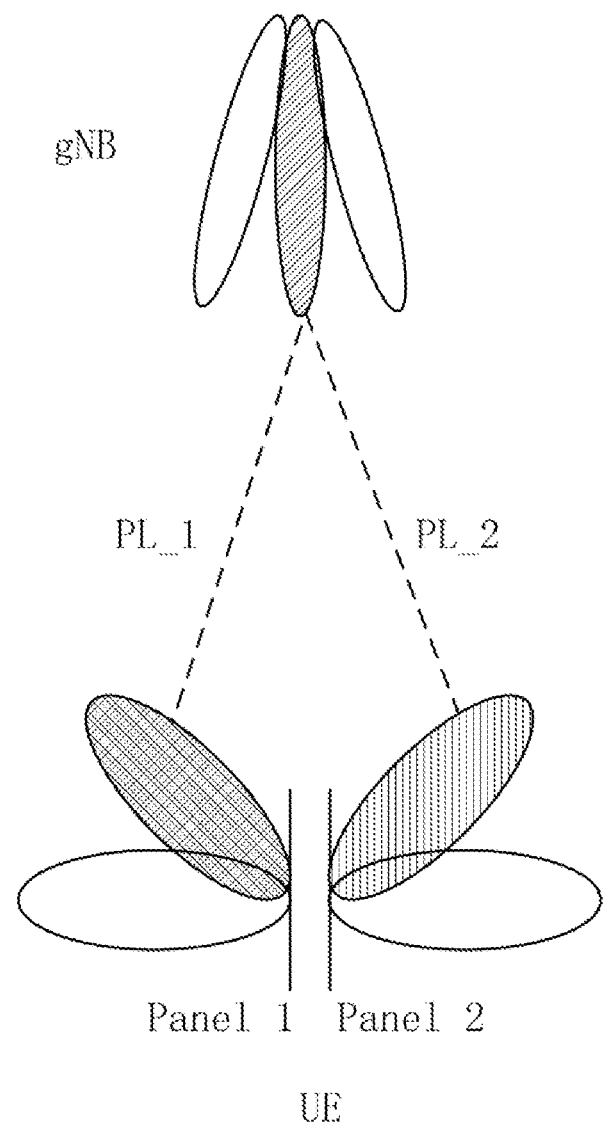
FIG. 2 shows an example of multiple beams from different panels.

In some existing implementations, multiple beams on the UE side are supported for simultaneous transmission. As shown in FIG. 2, the UE includes two panels, and two beams respectively from different panels communicate with one beam of the base station. The two simultaneously transmitted beams of the UE are described by a value of the SRI field in the DCI and correspond to a set of power control parameters. In other words, the base station configures one PL-RS for a plurality of beams transmitted simultaneously. The UE measures the PL-RS, and at the same time, multiple beams transmitted can measure the PL-RS, and multiple PL results can be obtained. The UE implementation may determine how a PL is derived from multiple PLs. The UE calculates a transmit power value for multiple beams that are simultaneously transmitted, and divides the power according to beam or port.

In current and future implementations, the base station side needs to implement multi-TRP (transmitter receiver point) configuration. Each TRP can include at least one panel. In an exemplary deployment, the geographic locations of TRPs may be far apart. Therefore, in a multi-TRP scenario, the channel environment encountered by each TRP may be dissimilar.

Figure 3:
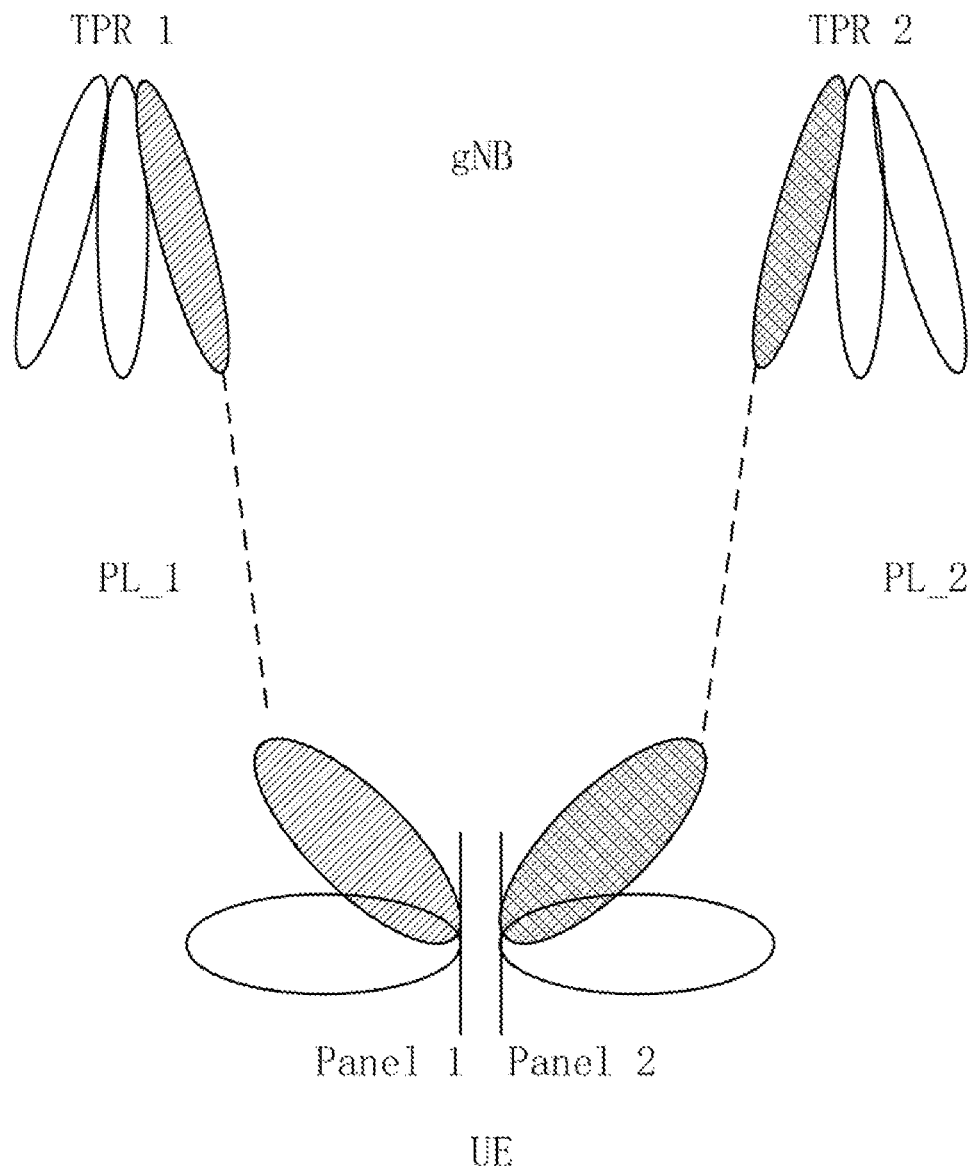
FIG. 3 shows an example of multiple transmission points (TRPs), each supporting multiple beams, configured at a base station.

As shown in FIG. 3, when two TRPs are configured by the base station, different TRPs are in different locations, so different interferences are received, and different transmission power requirements are required for the respective links. In a typical scenario, each TRP has a corresponding primary transmit beam. Therefore, it can be said that the base station may have different power requirements for different beams.

Embodiments of Multi-Beam Power Control Mechanisms

The disclosed technology provides the various implementations described below to enable different beam links to use power in a non-equal manner.

Embodiment 1 includes shared open loop power control parameter, closed loop power control parameter, PL-RS parameter, TPC command, and beam link power allocation parameter.

In some embodiments, UE determines a set of power control parameters, including open loop power control parameter, PL-RS parameter, and closed loop power control parameter, for multiple beam links transmitted by the UE at the same time, and receives a TPC command to adjust the total transmission power of multiple beam links. The UE also receives from base station, a power allocation parameter to determine power allocation parameters of the plurality of beam links transmitted simultaneously when allocating the total transmission power.

In some embodiments, the power allocation parameter includes a power allocation ratio and/or a power allocation difference. The power allocation ratio is the ratio of the total transmit power of a plurality of simultaneously transmitted beam links (and the power distribution ratio refers to the distribution ratio of the power linear value). The power allocation difference is the difference between the powers divided by the multiple beam links transmitted simultaneously.

For example, for two simultaneously transmitted beam links, the power allocation ratio is x:y, where x and y are positive numbers. For three simultaneously transmitted beam links, the power allocation ratio is x:y:z, where x, y, and z are positive numbers. It is also possible to indicate one of a plurality of predefined ratios using an indexed table implementation.

In an example, for two simultaneously transmitted beam links, the power allocation difference is a decibel (dB). Thus, the final power difference between the first beam link and the second beam link is a dB. where a is a real number. In another example, for three simultaneously transmitted beam links, the power distribution difference is a dB and b dB, where a and b are real numbers. Then, the difference between the first beam link and the second beam link is a dB, and the difference between the second beam link and the third beam link is b dB.

This method can reflect the interference on the receiving side on the basis of the traditional power control mechanism. The following examples are illustrative of the general concept of interference being controlled by a power control mechanism based on embodiments of the disclosed technology:

the power beam allocation ratio is increased for the transmission beam link corresponding to the TRP with heavy interference, and the power beam distribution ratio is reduced for the transmission beam link corresponding to the TRP with less interference.

in the multi-cell interference coordination scenario, the base station reduces the transmission power of some beam links to mitigate interference to other users.

the UE uses two beams to transmit uplink transmissions, and the base station configures a set of power control parameters for the two beams, and performs closed loop power control adjustment by using a common TPC command.

In some embodiments, the UE may calculate a total transmit power of the two beam links by using a set of power control parameters configured by the base station and a TPC command. The base station also configures or indicates a power allocation parameter for the UE, the power allocation parameter indicating a predefined ratio.

The predefined ratios are shown in the exemplary table below. Then the power allocation parameter indicates one of them by an integer index.

| Index | Ratio | Index | Ratio | Index | Ratio | Index | Ratio |
|---|---|---|---|---|---|---|---|
| 0 | 1:1 | 1 | 1:2 | 2 | 1:3 | 3 | 1:4 |
| 4 | 2:1 | 5 | 3:1 | 6 | 4:1 | 7 | Reserved value |

If the power allocation parameter number is 2, it means that the two beams are divided into total transmit power according to the ratio of 1:3. The power allocation parameter can also be a power allocation difference. Assuming that the difference is 3 dB, the difference between the transmission power of the first beam link and the transmission power of the second beam link is 3 dB.

The multiple beam links that are simultaneously transmitted, such as the first, second, and third beam links, may be determined according to one of the following methods: SRI (SRS resource indicator) corresponding to multiple beam links, and multiple beam links corresponding to multiple beam links The number of the reference signal resource, and the spatial relationship number corresponding to the multiple beam links.

The SRI corresponding to multiple beam links refers to the SRI field in the DCI including the UL grant information of the transmission of multiple beam links simultaneously, including more than one SRI value.

The spatial relationship corresponding to multiple beam links means that multiple beam links sent simultaneously are indicated by spatial relationships.

The foregoing power allocation indication may be notified to the UE by at least one of the following methods: high layer signaling (e.g., RRC signaling), MAC CE signaling, and physical layer signaling.

Embodiment 2 includes shared open loop power control parameter, closed loop power control parameter, PL-RS parameter, TPC command, and independent beam link power allocation parameters.

In some embodiments, the open loop power control parameter, closed loop power control parameter, PL-RS parameter, and TPC command are the same described in the context of Embodiment 1, but the power adjustment parameters of the beam link are configured separately for each beam link. In an example, the power adjustment parameter of the beam link is the amount of power deviation, such as 3 dB. In another example, the power adjustment parameter of the beam link is one of the indications in the predefined power adjustment amount.

The foregoing power control adjustment parameter may be notified to the UE by at least one of the following methods: higher-layer signaling, MAC CE signaling, and physical layer signaling. The higher-layer signaling may be RRC signaling.

For example, the UE uses two beams to send uplink transmissions. The base station configures a set of power control parameters for the two beams, and uses the common TPC command to perform closed loop power control adjustment. The UE calculates a total transmit power Psum0 of the multiple beam links by using a set of power control parameters configured by the base station and a TPC command. The total transmit power does not exceed the maximum transmit power.

In some embodiments, the total transmission power is equally distributed to a plurality of beam links, and then the power adjustments indicated by the power adjustment parameters are respectively performed on the two beam links. For example, the transmit power of the first beam link is increased by 3 dB, and the transmit power of the second beam link is decreased by 2 dB.

When the sum of the transmission powers of the adjusted plurality of beam links is not greater than the maximum transmission power, the transmission is performed by using the adjusted transmission power of each beam link.

When the sum of the transmission powers of the adjusted multiple beam links is greater than the maximum transmission power, the following operations are performed to ensure that the sum of the transmission powers of the multiple beam links is not greater than the maximum transmission power:

Step 1: The total transmission power Psum0 before adjustment is equally distributed to each beam link, and the transmission power Pbeam0(z) of each beam link is obtained, where z is the number (or index) of the beam link.

Step 2: The transmission power Pbeam1(z) of each beam link is obtained by adding the respective power adjustment amounts to the transmission power Pbeam0(z) of each beam link.

Step 3: When the sum of the transmission powers Pbeam1(z) of the respective beam links exceeds the maximum power, the power Pbeam1(z) of each beam link is proportionally reduced to obtain Pbeam2(z), so that the power of each beam link Pbeam2 The sum power of (z) is equal to the maximum transmit power; otherwise, the power Pbeam2(z) of each beam link is equal to the power Pbeam1(z) of each beam link.

Finally, the power of each beam link is Pbeam2(z).

For example, for a scenario of two beam links, when the UE uses the power control parameters configured by the base station and the TPC command to calculate the power required for the two beam links to be 25 dBm, and the maximum transmit power is 23 dBm, the total of the two beam links is the transmission power of the smaller of the two, i.e. 23 dBm. Thus, Psum0=23 dBm. After the Psum0 is equally distributed to the two beam links, the transmit power Pbeam0(z) of each beam link is 20 dBm (step 1). Assuming that the base station indicates that the first beam link power adjustment amount of the UE is +3 dB and the second beam link power adjustment amount is −2 dB, the adjusted transmit power Pbeam1 (z=1) of the first beam link is 23 dBm, and The second beam link transmits the ice cone Pbeam1 (z=2) 18 dBm (step 2).

Since the sum of Pbeam1 (z=1) and Pbeam1 (z=2) exceeds 23 dBm, it is converted to a linear power value for equal reduction, and the sum and power are 23 dBm. The linear value of 23 dBm is about 200 mW, the linear value of 18 dBm is about 63.0957 mW, and the sum of the two is about 263.0957 mW. The linear value of 23 dBm is about 200 mW. Therefore, the scale factor for the proportional reduction is 200/263.0957. It can also be converted to a dB value of −1.2 dB. Thus, the transmission power Pbeam2 (z=1) of the first beam link is 23 dBm−1.2-dBm=21.8 dBm, and the transmission power Pbeam2 (z=2) of the second beam link is 18 dBm−1.2 dBm=16.8 dBm.

Embodiment 3 includes shared open loop power control parameter, closed loop power control parameter and PL-RS parameter, and independent TPC commands.

In some embodiments, UE determines a set of power control parameters for the plurality of beam links simultaneously transmitted by the UE, including open loop power control parameter, PL-RS parameter, and closed loop power control parameter. The base station separately sends a plurality of TPC commands, each of which is for each beam link for adjusting the transmit power of the multiple beam links.

In the conventional DCI, only one TPC command is sent for each UE. The disclosed technology proposes a method for extending the TPC command to multiple beam links.

For example, a UE includes N TPC commands in the DCI, which corresponds to N simultaneously transmitted beam links, where N is an integer greater than one. Although the N TPC commands correspond to the TPC commands of the N beam links, they only correspond to one closed loop power control, assuming that the closed loop power control number is l=0. It is also possible that 1 is another value.

When the closed loop power control mode is the cumulative closed loop power control, the transmission power is calculated by using the shared open loop, the PL-RS, and the local closed loop power control adjustment amount f(i−1, l=0) of the previous transmission update, where i is the number of the transmission.

When the closed loop power control mode is absolute closed loop power control, the transmission power is calculated by using the above shared open loop, PL-RS and local closed loop power control adjustment amount to be 0.

Then, using the method described in the context of Embodiment 2, the "beam link power adjustment parameter" is replaced with the TPC command of the beam link of Embodiment 3, and the transmission power of the different beam links can be obtained.

Finally, when the closed loop power control mode is the cumulative closed loop power control, the local closed loop power control adjustment amount f(i, l=0) of the current transmission is updated by one of the following methods:

f(i,l=0)=f(i−1,l=0)+the sum of the TPC commands of the N beam links f(i,l=0)=f(i−1,l=0)+minimum of the TPC commands of N beam links f(i,l=0)=f(i−1,l=0)+maximum in the TPC command of N beam links In some embodiments, and where there is a multicast TPC command between the scheduled transmission time of the last transmission and the scheduling time of this transmission, the TPC commands should be added to the corresponding closed loop power control number.

Embodiment 4 includes shared open loop and PL-RS parameters, and independent closed loop parameters and TPC commands.

In some embodiments, UE determines a set of power control parameters, including open loop power control parameters and PL-RS parameters, for multiple beam links simultaneously transmitted by the UE. UE determines closed loop power control parameters for each beam link, and received TPC commands respectively to adjust the transmit power of multiple beam links. The UE updates the local closed loop power control adjustment amount of each beam link of the current transmission according to the TPC command of each beam link and the local closed loop power control adjustment amount corresponding to the closed loop power control number of each link.

The transmit power of each beam link is calculated for each beam link by using the configured open loop power control parameters, PL-RS parameters, and each beam's own local closed loop power control adjustment. When the sum of the transmission powers of all the beam links exceeds the maximum transmission power, the transmission power of each beam link is proportionally reduced, so that the sum of the transmission powers of the final plurality of beam links is not greater than the transmission power.

Embodiment 5 includes shared PL-RS and closed loop parameters, and independent open loop parameters and TPC commands.

In some embodiments, UE determines a set of power control parameters for the plurality of beam links simultaneously transmitted by the UE, including: closed loop power control parameter and PL-RS parameter. The base station configures open loop power control parameters each of which is for each beam link, and sends a TPC command to the UE to adjust the transmit power of multiple beam links.

In some embodiments, the correspondence between multiple TPC commands and one closed loop is similar to that of Embodiment 3. A UE in the DCI includes N TPC commands, which respectively correspond to N simultaneously transmitted beam links, where N is an integer greater than one.

When the closed loop power control mode is the cumulative closed loop power control, the transmission power is calculated by using the shared PL-RS and the local closed loop power control adjustment amount f(i−1, l=0) of the previous transmission update, wherein i is the number of the transmission.

When the closed loop power control mode is absolute closed loop power control, the transmission power is calculated by using the above shared open loop, PL-RS, and local power control adjustment amount to be 0.

The UE calculates the transmit power of each beam for each beam link using the configured open loop power control parameters, each beam's own local closed loop power control adjustment, and the shared PL-RS. When the sum of the transmission powers of all the beam links exceeds the maximum transmission power, the transmission power of each beam link is proportionally reduced, so that the sum of the transmission powers of the final plurality of beam links is not greater than the transmission power. Finally, when the closed-loop power control mode is cumulative closed-loop power control, update the local closed-loop power control adjustment amount f(i, l=0) of this transmission by one of the following methods:

f(i,l=0)=f(i−1,l=0)+the sum of the TPC commands of the N beam links f(i,l=0)=f(i−1,l=0)+minimum of the TPC commands of N beam links f(i,l=0)=f(i−1,l=0)+maximum in the TPC command of N beam links.

Embodiment 6 includes shared PL-RS parameter, and independent open loop parameters, closed loop parameters and TPC commands.

In some embodiments, UE determines a set of power control parameters for the plurality of beam links simultaneously transmitted by the UE, including: a PL-RS parameter. The base station configures an open loop power control parameter and a closed loop power control parameter for each beam link, and respectively sends a TPC command for adjusting the transmit power of multiple beam links. The UE updates the local closed loop power control adjustment amount of each beam link of the current transmission according to the TPC command of each beam link and the local closed loop power control adjustment amount corresponding to the closed loop power control number of each link.

The transmit power of each beam is calculated for each beam link using the configured open loop power control parameters, each beam's own local closed loop power control adjustment, and the shared PL-RS parameters. When the sum of the transmission powers of all the beam links exceeds the maximum transmission power, the transmission power of each beam link is proportionally reduced, so that the sum of the transmission powers of the final plurality of beam links is not greater than the transmission power.

Embodiment 7 includes shared closed loop parameters and TPC commands, and independent open loop and PL-RS parameters.

In some embodiments, UE determines a closed loop power control for multiple beam links simultaneously transmitted by the UE, and receives a TPC command for adjusting the transmit power of multiple beam links. The UE determines open loop power control parameters and PL-RS parameters for each beam link.

The closed loop power control number may be fixed to l=0, or may be configured or indicated to the UE by the base station as a common parameter of multiple links. The UE updates the local closed loop power control adjustment amount shared by each beam link of the current transmission according to the shared TPC command and the local closed loop power control adjustment amount corresponding to the shared closed loop power control number.

The transmit power of each beam is calculated for each beam link with its own open-loop power control parameters, PL-RS parameters, and each beam's own local closed-loop power control adjustment. When the sum of the transmission powers of all the beam links exceeds the maximum transmission power, the transmission power of each beam link is proportionally reduced, so that the sum of the transmission powers of the final plurality of beam links is not greater than the transmission power.

Embodiment 8 includes shared PL-RS parameters, closed loop parameters and TPC commands, and independent open loop parameters.

In some embodiments, UE determines open loop power control parameters for each beam link. The UE determines a set of power control parameters for the multiple beam links that are simultaneously transmitted by the UE, including:

PL-RS parameters, closed loop power control parameter, and receives TPC commands to adjust the transmit power of multiple beam links. The UE updates the shared local closed loop power control adjustment amount by using the TPC command.

The UE calculates the transmission power of each link by using the shared PL-RS, the shared local closed-loop power adjustment amount, and the own open-loop power control parameters of each beam link. When the sum of the transmission powers of all the beam links exceeds the maximum transmission power, the transmission power of each beam link is proportionally reduced, so that the sum of the transmission powers of the plurality of beam links is not greater than the transmission power.

When different open loop power control parameters are configured for different beam links, high layer signaling, such as RRC signaling configuration, can be used.

In order to implement flexible power control of different beam links more flexibly, the open loop power control parameters can also be sent using MAC CE or physical layer signaling. In other words, the MAC CE or physical layer signaling can be used to indicate the open loop power control parameters of different beam links. The MAC CE and the physical layer signaling can also jointly determine open loop power control parameters of different beam links.

The above MAC CE and physical layer signaling may indicate that the open loop power control parameter may directly indicate the values of P0 and α, or may indicate one of multiple sets of RRC configured open loop power control parameters including P0 and α.

Embodiment 9 includes independent open loop parameters, closed loop parameters, PL-RS parameters and TPC commands.

In some embodiments, UE determines an open loop power control parameter, a closed loop power control parameter, and a PL-RS parameter for each beam link, and respectively receives a TPC command for adjusting the transmit power of multiple beam links.

The number of beam links indicated by the base station when scheduling the uplink transmission is greater than 1, each beam link corresponds to one transmission beam, and the power control parameters of the beam link can be determined.

The number of TPC commands sent by the base station to the UE is the same as the number of beam links transmitted by the uplink. In the DCI, multiple TPC commands are respectively in one-to-one correspondence with multiple beam links.

The UE updates the local closed loop power control adjustment amount of each beam link of the current transmission according to the TPC command of each beam link and the local closed loop power control adjustment amount corresponding to the closed loop power control number of each link.

The transmit power of each beam link is calculated for each beam link with its own open loop power control parameters, PL-RS parameters, and respective local closed loop power control adjustments. When the sum of the transmission powers of all the beam links exceeds the maximum transmission power, the transmission power of each beam link is proportionally reduced, so that the sum of the transmission powers of the final plurality of beam links is not greater than the transmission power.

Implementations for Independent Power Control Embodiments

In some embodiments, RRC is used for the composite beam SRI configuration or the above-mentioned power control parameters to distinguish whether multiple links use independent power control parameters For example, if the RRC configures a set of power control parameters for the composite beam SRI, it indicates that the composite beam SRI configures a set of power control parameters shared by the multi-beam link in a conventional manner; if the RRC does not configure the power control parameters for the composite SRI, using the SRI power control parameter corresponding to a single SRS resource in the composite SRI as an independent power control parameter.

In some embodiments, use MAC CE or DCI information to explicitly indicate whether multiple links use independent power control For example, although RRC configures a set of power control parameters for the composite beam SRI, it can use MAC CE or DCI information to indicate whether the SRI of the composite beam uses a set of power control parameters, or whether to use the SRI power control corresponding to each SRS beam included therein.

In some embodiments, multiple TPC commands corresponding to independent closed loops are implemented by one of the following methods:

Although the downlink DCI is sent on multiple beam links, the DCI content is the same, including all the multiple TPC commands. The number of TPC commands included in the DCI is the same as the maximum number of closed loop power control supported by the UE.

The downlink is also an independent link as the uplink. The DCI only needs to include one TPC command. Different beam links send different TPC commands. The UE needs to distinguish the TPC commands of the DCI received from different beams for the transmission of the respective beams.

Exemplary Embodiments when Exceeding the Maximum Power Limit

In the context of the above embodiments, if the sum of the respective powers of the plurality of beam links simultaneously transmitted exceeds the maximum transmission power limit, one of the following factors or methods must be considered when mitigating this issue:

A) Determining Power Allocation of Each Beam Link According to a Transmission Power Requirement.

In some embodiments, priority may be given to the transmission of beam links with relatively low transmission power requirements. For example, there are two beam links with different required powers. When it is not enough to transmit according to the required power of two beam links, the transmission power of the beam link with high demand power is first reduced, but not to a significant extent. The transmission power of the beam link with low power requirement is transmitted until the sum of the transmission powers of the two beam links is not greater than the maximum transmission power. When the higher required power drops to the same as the lower required power, and the sum of the transmission powers is still greater than the maximum transmission power, the ratio is reduced until the sum of the transmission powers of the two beam links is not greater than the maximum transmission power.

B) Determine the Power Allocation of Each Beam Link According to the PL of Each Beam.

In some embodiments, priority may be given to ensuring that the PL is transmitted over a small beam link. For example, when different beam links have different PL values, the power reduction is started from the beam link with a larger PL value until the reduction amount offsets the difference of the PL, or the sum of the transmission powers of different beam links is not Greater than the maximum transmit power. When the amount of the reduction reaches the difference of the PL, but the sum of the transmission powers of the different beam links is still greater than the maximum transmission power, the ratio is reduced until the sum of the transmission powers of the two beam links is not greater than the maximum transmission power.

In some embodiments, the transmission power is reduced in proportion to the PL value. For example, the larger the PL value, the larger the power reduction, and the smaller the power value of the PL power, the smaller the power reduction.

C) Determine the Power Allocation of Each Beam Link According to the TPC Command of Each Beam Link.

In some embodiments, if the TPC command of each beam link can be resolved, the beam link with the lower TPC command value preferentially performs power reduction, and the difference between the TPC command values is reduced at most, when the sum of the transmission powers of the respective beam links is not satisfied. When the maximum transmission power is greater than, the transmission power of each link is reduced proportionally until the sum of the transmission powers of the respective beam links is not greater than the maximum transmission power.

D) Determine the Power Allocation of Each Beam Link According to the Configured Open Loop Power Control Parameters.

In some embodiments, if the P0 value of each beam link is different, the beam link with a smaller P0 preferentially performs power reduction, and at most, the power difference of P0 is reduced. When the sum of the transmission powers of the respective beam links is not satisfied, the sum is not greater than the maximum transmission power. The transmission power of each link is reduced proportionally until the sum of the transmission powers of the respective beam links is not greater than the maximum transmission power.

In some embodiments, if the a values of the respective beam links are different, the beam link with the smaller a is preferentially power-cut until the sum of the transmission powers of the respective beam links is not greater than the maximum transmission power.

E) Determine the Power Allocation of Each Beam Link According to the Configured Closed Loop Power Control Parameters.

In some embodiments, if the closed loop power control numbers of the respective beam links are different, the beam link with the larger closed loop power control number preferentially performs power reduction until the sum of the transmission powers of the respective beam links is not greater than the maximum transmission power.

F) Determine the Power Allocation of Each Beam Link According to the Beam Link Number.

In some embodiments, the beam link number is larger and the power is preferentially cut until the sum of the transmission powers of the respective beam links is not greater than the maximum transmission power.

G) Determine the Power Allocation of Each Beam Link According to the Service Type of the Uplink Transmission In some embodiments, if the service type of the uplink transmission of each beam link is different, the beam link of the service type with a lower priority preferentially performs power reduction until the sum of the transmission powers of the respective beam links is not greater than the maximum transmission power.

H) Determine the Power Allocation of Each Beam Link According to the Modulation Coding Scheme (MCS) of the Uplink Transmission In some embodiments, if the modulation coding order of the uplink transmission of each beam link is different, the beam link with the high modulation coding order is prioritized for power reduction until the sum of the transmission powers of the respective beam links is not greater than the maximum transmission power.

I) Determine the Power Allocation of Each Beam Link According to the Bandwidth of the Uplink Transmission.

In some embodiments, if the transmission bandwidth of the uplink transmission of each beam link is different, the beam link with a large transmission bandwidth preferentially performs power reduction until the sum of the transmission powers of the respective beam links is not greater than the maximum transmission power.

In the above examples, the above power adjustment target is a beam link, and may also be one of the following: a beam, a beam group, a panel, a panel group, a spatial relationship, and a spatial relationship group.

In some embodiments, more than one of the above power adjustment options may be applied when using Embodiments 1-9 of the disclosed technology. For example, when multiple panels are simultaneously transmitted, it may be necessary to perform power adjustment of each panel by one of the above methods.

In some embodiments, which of Embodiments 1-9 may be used may be based on at least one of the following factors:

Transmission method; for example, non-codebook based transmission uses one of the above methods 1 to 9; codebook based transmission uses the traditional power control method.

Number of layers; for example, when the number of layers is greater than 1, it is determined that one of the above modes 1 to 9 is applied; when the number of layers is equal to 1, the conventional power control mode is used.

In some embodiments, the ideal return capability of the TRP is considered. In an example, when supporting ideal backhaul, the power allocation ratio is carried by physical layer signaling and/or MAC CE. In another example, when non-ideal backhaul is supported, the power allocation ratio is configured by higher layer signaling, such as RRC signaling. In yet another example, when supporting ideal backhaul, the power adjustment parameters are carried by physical layer signaling and/or MAC CE. In yet another example, when non-ideal backhaul is supported, the power adjustment parameters are configured by higher layer signaling, such as RRC signaling.

Embodiments of Beam Recovery Mechanisms

Embodiments of the disclosed technology may also be used after beam recovery, when beam(s) of PUCCH transmission is supposed to be changed, the closed loop power control for PUCCH transmission should be initialized. Existing implementations do not consider this initialization in the case of PUCCH or PUSCH transmissions.

In the examples and methods described in this document, initializing the closed loop power control of an outbound channel transmission comprises resetting an outbound channel transmission index and assigning a closed loop power control value.

In some embodiments, and after beam recovery success, a closed loop power control of an outbound channel transmission (also referred to as "an outbound channel") is initialized to one of the following values: {zero, a ramp-up power, a TPC power offset, a sum of ramp-up power and TPC power offset}. Herein, the ramp-up power corresponds to the total power ramp-up requested by higher layers from the first to the last random access preamble. In an example, the outbound channel transmission includes a PUCCH, PUSCH or SRS transmission.

Figure 4:
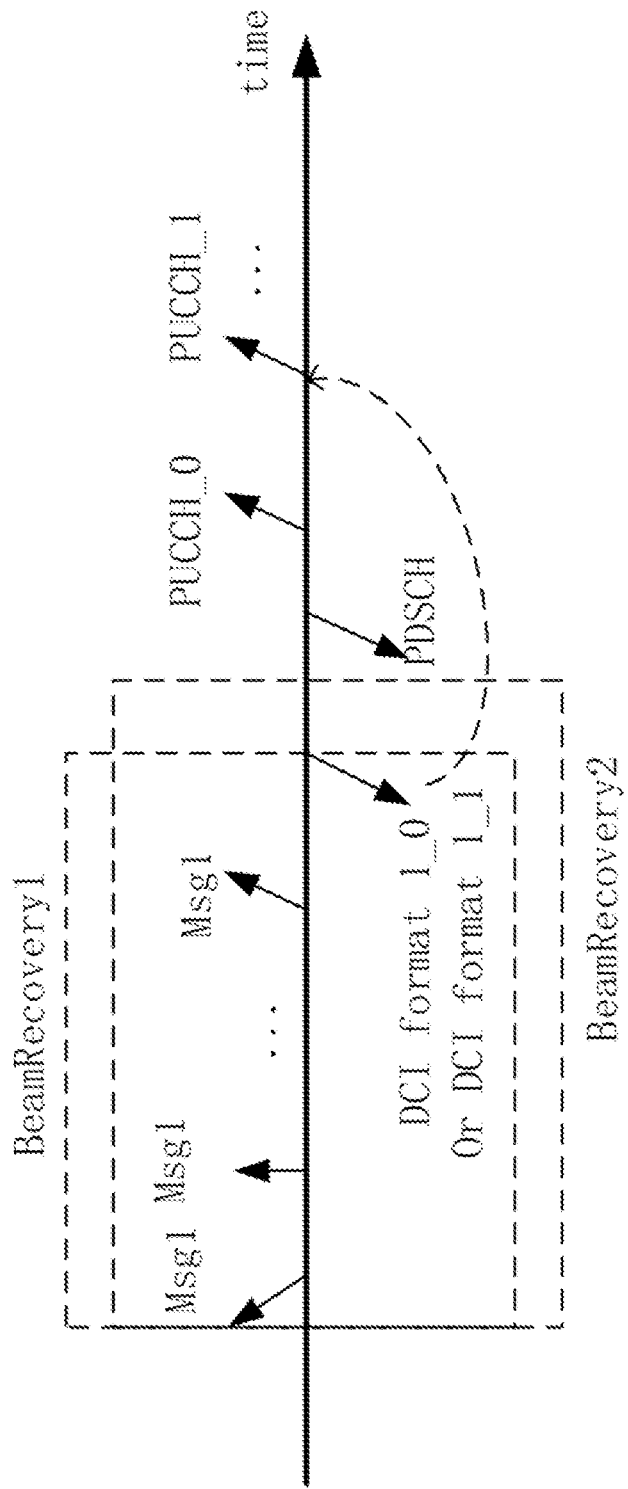
FIG. 4 shows an example of beam recovery based on a format of downlink control information (DCI).

FIG. 4 shows an example of the outbound channel that is a PUCCH transmission. As shown therein, after transmitting a plurality of Msg 1 which are beam recovery request, UE detects DCI format 1_0 or DCI format 1_1 in a search space set provided by recoverySearchSpaceId, beam recovery is assumed succeeded.

In some embodiments, one of the following schemes can be used to determine beam recovery success:

- The UE detects a DCI format with cyclic redundancy check (CRC) scrambled by cell radio-network temporary identifier (C-RNTI), or a MCS-C-RNTI in the search space set provided by recoverySearchSpaceId. This is shown as the end of BeamRecovery1 in FIG. 4.
- After K symbols from a last symbol of a first PDCCH reception in a search space set provided by recoverySearchSpaceId for which the UE detects a DCI format with CRC scrambled by C-RNTI or MCS-C-RNTI, where K is a non-negative number. This is shown as the end of BeamRecovery2 in FIG. 4.
- Detecting the link recovery confirmation information, which is a downlink control indicator with cyclic redundancy check (CRC) scrambled by a first type of radio network temporary identifier. Detecting the link recovery confirmation information could also be considered determining beam recovery is successful.

In some embodiments, and after beam recovery success, the closed loop power control of PUCCH is initialized, one of the following schemes is used to determine which PUCCH transmission should be used to initialize the closed loop power control of PUCCH. In an example, the outbound channel is the first outbound channel after beam recovery success, as indicated by PUCCH_0 in FIG. 4, which is also called the determined PUCCH transmission. In another example, the outbound channel is in response to a detection of the first of DCI format 1_0 or DCI format 1_1 after beam recovery success, as indicated by PUCCH_1 in FIG. 4, which is also called the determined PUCCH transmission.

In some embodiments, and for the determined PUCCH transmission, if it is in response to the detection of DCI format 1_0 or DCI format 1_1. Then the close loop of PUCCH is initialized as one of the following values: 0, ramp-up power, TPC power offset, the sum of ramp-up power and TPC power offset. The TPC power offset is TPC command value from the DCI format 1_0 or the DCI format 1_1.

In some embodiments, and for the determined PUCCH transmission, if it is not in response to the detection of the DCI format 1_0 or DCI format 1_1, the closed loop power control of the outbound channel is initialized to one of the following values: 0, ramp-up power.

Figure 5:
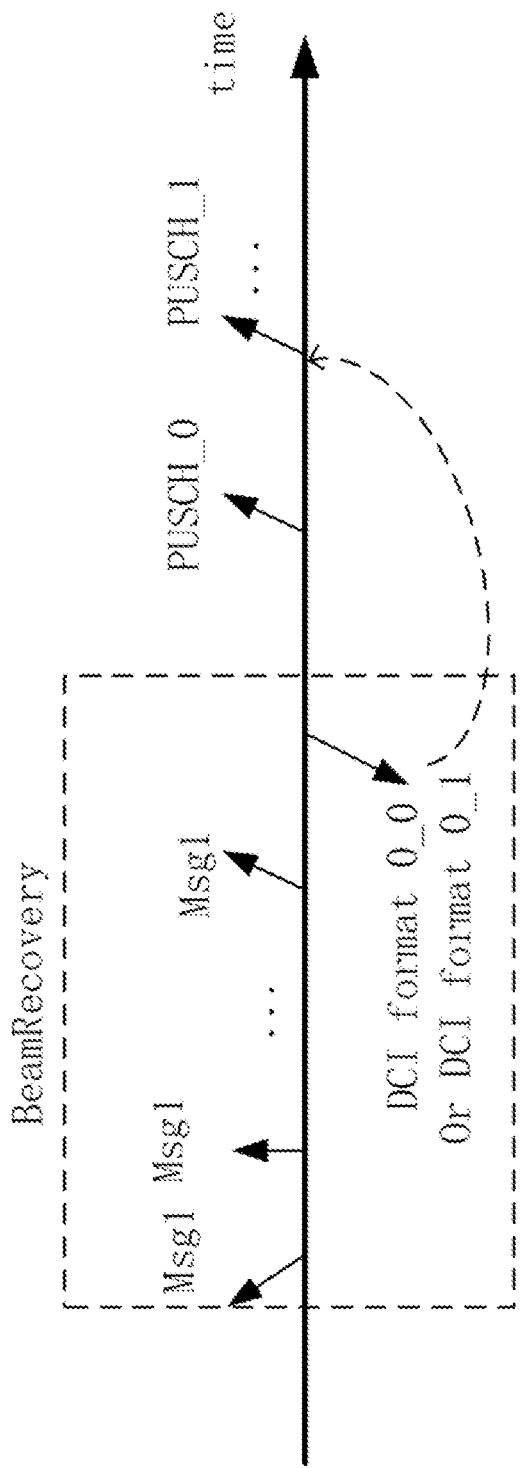
FIG. 5 shows another example of beam recovery based on a DCI format.

As shown in FIG. 5, beam recovery is determined based on DCI format 0_0 or 0_1, PUSCH_0 is configured by ConfiguredGrantConfig, PUSCH_1 is scheduled by DCI format 0_0 or DCI format 0_1. The determined PUSCH transmission is PUSCH_0 if the first PUSCH transmission after beam recovery success is assumed, and the determined PUSCH is PUSCH_1 if PUSCH is scheduled by the first DCI format 0_0 or DCI format 0_1 after beam recovery success is assumed. In an example, and for the determined PUSCH transmission, if it is scheduled by DCI format 0_0 or DCI format 0_1, then close loop power control for PUSCH is 0, ramp-up power, TPC power offset, the sum of ramp-up power and TPC power offset. The TPC power offset is TPC command value from the DCI format 0_0 or the DCI format 0_1. In another example, and for the determined PUSCH transmission, configured by ConfiguredGrantConfig, then close loop is initialized to one of the following values: 0, ramp-up power.

In some embodiments, the TPC power offset is one TPC command value from one DCI signal, or the sum of a plurality of TPC command values from a plurality of DCI signals. The TPC power offset is the sum of a plurality of TPC command values from a plurality of DCI signals within a period, and the format of the DCI corresponds to the outbound channel.

In some embodiments, and when the outbound channel is PUCCH or PUCCH transmission, DCI format comprises at least one of the followings: DCI format 1_0, DCI format 1_1, DCI format 2_2 with CRC scrambled by TPC-PUCCH-RNTI. E.g. DCI format comprises DCI format 1_0 and DCI format 1_1. or DCI format comprises DCI format 1_0 and DCI format 1_1 and DCI format 2_2 with CRC scrambled by TPC-PUCCH-RNTI.

In some embodiments, and when the outbound channel is PUSCH or PUSCH transmission, DCI format comprises at least one of the followings: DCI format 0_0, DCI format 0_1, DCI format 2_2 with CRC scrambled by TPC-PUSCH-RNTI. E.g. DCI format comprises DCI format 0_0 and DCI format 0_1. or DCI format comprises DCI format 0_0 and DCI format 0_1 and DCI format 2_2 with CRC scrambled by TPC-PUSCH-RNTI.

In some embodiments, the period starting time is determined by the beam recovery success or the PDCCH which contains the DCI used to determine beam recovery success. e.g. the beginning of the PDCCH which contains the DCI used to determine beam recovery success. In other embodiments, the period ending time is determined by the outbound channel transmission starting time or $K_c$ symbols before the outbound channel transmission starting time. However, the starting time of a TPC command accumulation period (also referred to as a period) of an outbound channel transmission may not be earlier than beam recovery success. During TPC command accumulation period of an outbound channel transmission, all the TPC commands from the DCI signals corresponds to the outbound channel transmission are accumulated.

- If a PUSCH transmission is scheduled by a DCI format 0_0 or DCI format 0_1, $K_c$ is the number of symbols after the last symbol of a corresponding PDCCH reception and before a first symbol of the PUSCH transmission.
- If a PUSCH transmission is configured by ConfiguredGrantConfig, $K_c$ is the number of $K_{PUSCH,min}$ symbols equal to the product of a number of symbols per slot, and the minimum of the values provided by k2 in PUSCH-ConfigCommon.
- If the PUCCH transmission is in response to a detection by the UE of a DCI format 1_0 or DCI format 1_1, $K_c$ is the number of symbols after the last symbol of a corresponding PDCCH reception and before a first symbol of the PUCCH transmission.
- If the PUCCH transmission is not in response to a detection by the UE of a DCI format 1_0 or DCI format 1_1, $K_c$ is a number of $K_{PUCCH,min}$ symbols equal to the product of a number of symbols per slot, and the minimum of the values provided by k2 in PUSCH-ConfigCommon.

Figure 6:
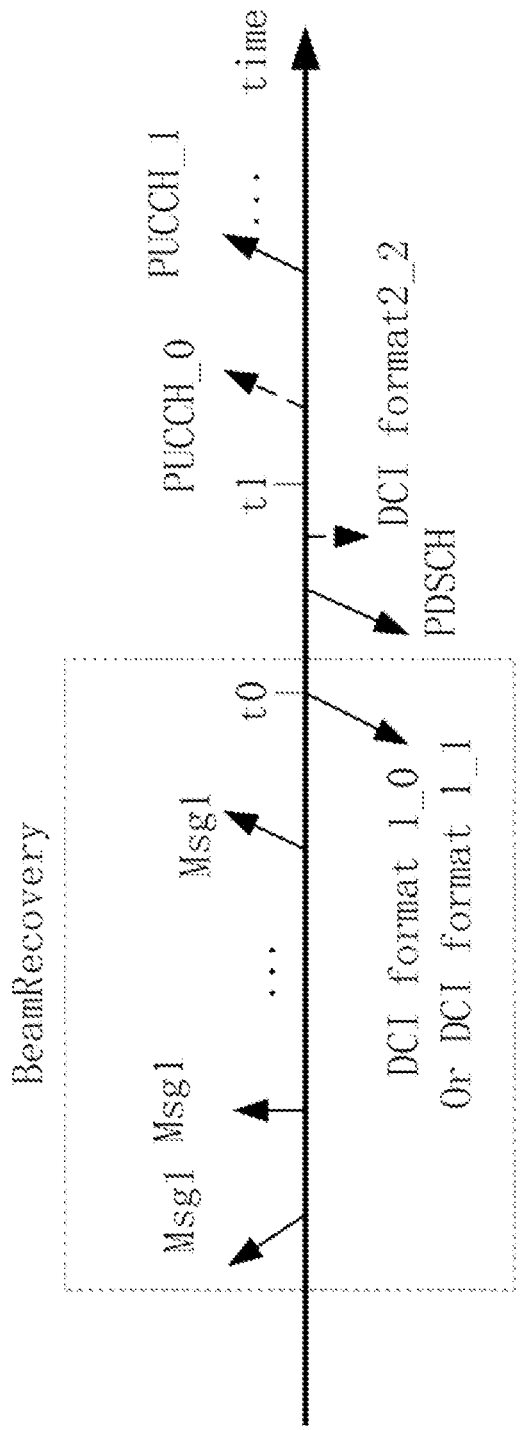
FIG. 6 shows yet another example of beam recovery based on a DCI format.

As shown in FIG. 6, for PUCCH_0, ending time of period is t1, starting time of period is t0, during the period, there are 2 DCI signals: DCI format 1_0 or 1_1, and DCI format 2_2. If DCI format 2_2 is DCI format 2_2 with CRC scrambled by TPC-PUCCH-RNTI, sum of TPC command values in DCI format 1_0 or 1_1, and DCI format 2_2 is considered to be TPC power offset. For PUCCH_1, starting time of period is the starting time of PDCCH which contains the DCI format 1_0 or 1_1, ending time of period is the ending time of PDCCH which contains the DCI format 1_0 or 1_1, so only TPC command in DCI format 1_0 or 1_1 is considered to be TPC power offset.

In an example (and in the context of FIG. 6), the first PUCCH transmission is not in response to DCI format 1_0 or DCI format 1_1, then closed loop power control of PUCCH is initialized, the PUCCH transmission index i is reset to 0, and the closed loop power control value is assigned according to the above method. Then there is a PUCCH transmission in response to DCI format 1_0 or DCI format 1_1, say PUCCH transmission i=1. As shown in FIG. 6, PUCCH transmission i=0 is PUCCH_0, and PUCCH transmission i=1 is PUCCH_1. The ending time of TPC command accumulation period of PUCCH transmission i=1 is supposed to be the beginning of the PDCCH which contains the DCI format 1_0 or DCI format 1_1, which is t0 in FIG. 6. The starting time of TPC command accumulation period of PUCCH transmission i=1 is supposed to be determined as the ending time of TPC command accumulation period of PUCCH transmission i−i0. If i0=1, the starting time t1 in FIG. 6.

In this example, i0 is the smallest integer which meets the requirement of the ending time of TPC command accumulation period of a PUCCH transmission i−i0 is earlier than the ending time of TPC command accumulation period of a PUCCH transmission i. the PUCCH transmission i−i0 is called the qualified PUCCH transmission. Since t1 is not earlier than t0, i0=1 is not qualified. If i0>1, 1−i0 is negative which is not real. So there is no qualified i0.

In another example, for an outbound channel transmission i, if the ending time of TPC command accumulation period of a qualified outbound channel transmission i−i0 is earlier than beam recovery success, the starting time of TPC command accumulation period of an outbound channel transmission i is the beginning of PDCCH which contains the DCI used for determining beam recovery success.

In yet another example, for an outbound channel transmission i, if there is no qualified i0, the starting time of TPC command accumulation period of an outbound channel transmission i is the beginning of PDCCH which contains the DCI used for determining beam recovery success.

In some embodiments, the qualified outbound channel transmission i−i0 is determined based on i0 being the smallest integer which meets the requirement of the ending time of TPC command accumulation period of an outbound channel transmission i−i0 being earlier than the ending time of TPC command accumulation period of an outbound channel transmission i.

Exemplary Methods for the Disclosed Technology

Embodiments of the disclosed technology advantageously enable the base station to flexibly control the transmit power of multiple simultaneously transmitted beams on the UE side. The UE can flexibly adjust the power of each beam according to the characteristics of the transmission of each beam, the result of channel measurement, and so on.

Figure 7:
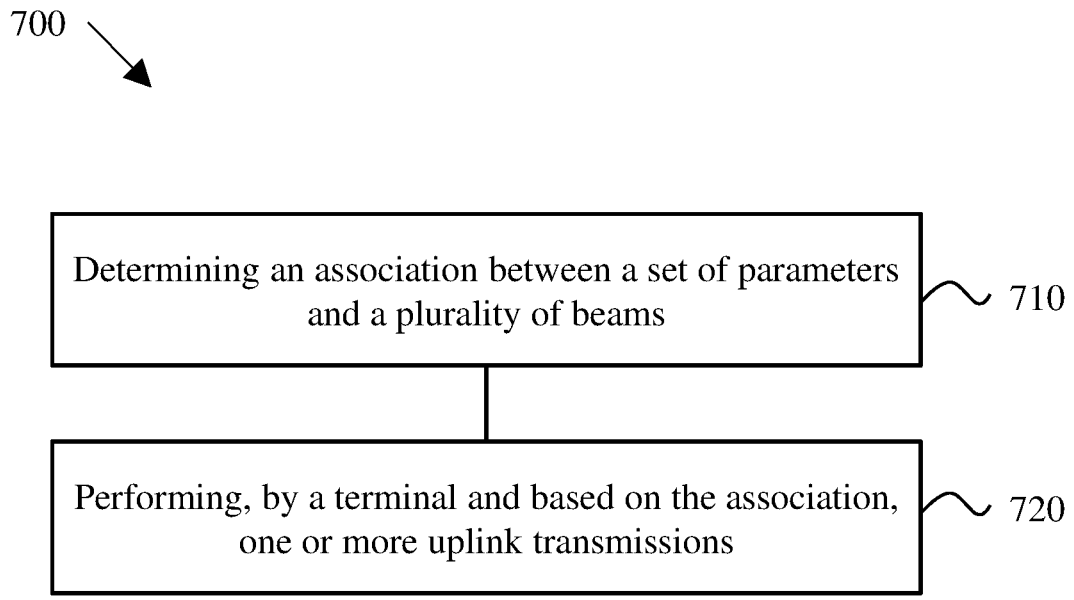
FIG. 7 shows an example of a wireless communication method, in accordance with some embodiments of the presently disclosed technology.

FIG. 7 shows an example of a wireless communication method 700 for multi-beam power control. The method 700 includes, at step 710, determining an association between a set of parameters and a plurality of beams. In some embodiments, the set of parameters comprises at least one of the following parameters: one or more open loop parameters, one or more closed loop parameters, one or more transmit power control (TPC) commands or one or more path loss reference signal (PL-RS) parameters.

The method 700 includes, at step 720, performing, by a terminal and based on the association, one or more uplink transmissions.

Figure 8:
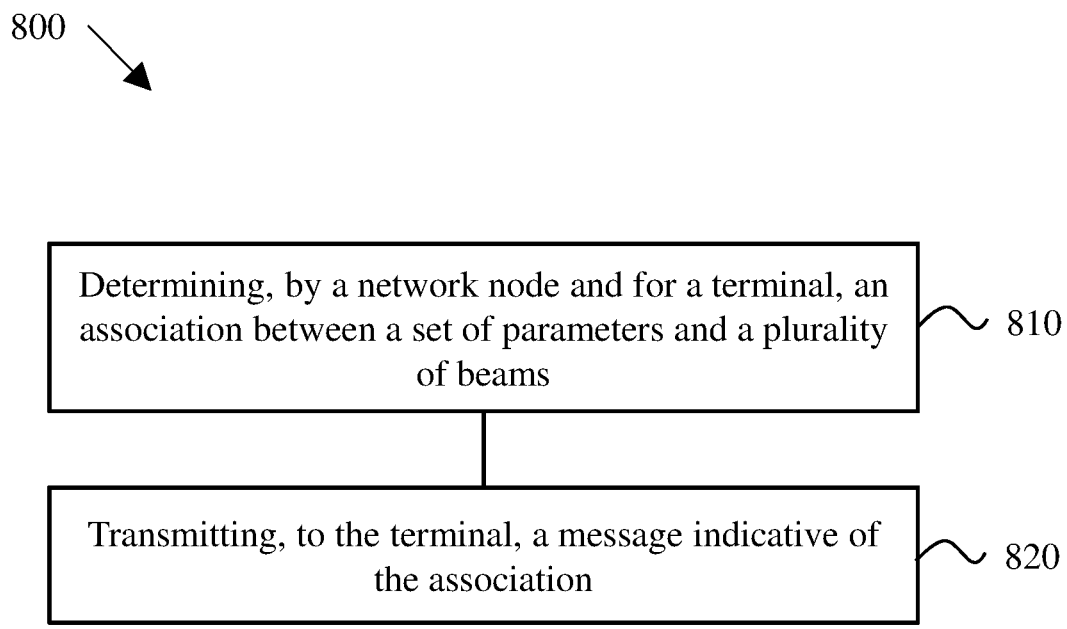
FIG. 8 shows an example of another wireless communication method, in accordance with some embodiments of the presently disclosed technology.

FIG. 8 shows an example of a wireless communication method 800 for multi-beam power control. The method 800 includes, at step 810, determining, by a network node and for a terminal, an association between a set of parameters and a plurality of beams.

The method 800 includes, at step 820, transmitting, to the terminal, a message indicative of the association.

In some embodiments, a beam of the plurality of beams comprises one or more reference signals (RSs), one or more resource indications, one or more SRS (sounding RS) resource indications, one or more spatial relations, one or more spatial-domain filters, one or more precoding matrices, one or more ports, one or more port groups, one or more panels or one or more antenna groups.

In some embodiments, the open loop parameter comprises at least one of a path loss coefficient or a received target power. In other embodiments, the set of parameters further comprises a power allocation ratio parameter. In an example, the power allocation ratio parameter comprises an index that maps to a predefined ratio of a plurality of powers for the plurality of beams. In another example, the power allocation ratio parameter is used to allocate the plurality of powers to the plurality of beams for the one or more uplink transmissions. In yet another example, the power allocation ratio parameter is signaled in medium access control (MAC) control element (CE) signaling, physical layer signaling or radio resource control (RRC) signaling.

In some embodiments, the set of parameters further comprises one or more power allocation offset parameters. In an example, an equal power is allocated to each of the plurality of beams, and wherein each of the one or more power allocation offset parameters comprise a value that offsets the equal power of a corresponding beam of the plurality of beams. In another example, each of the one or more power allocation offset parameters is associated with a respective beam of the plurality of beams, and wherein a value of at least one of the one or more power allocation offset parameters directly offsets a corresponding power of the respective beam. In yet another example, the one or more power allocation offset parameters are signaled in medium access control (MAC) control element (CE) signaling, physical layer signaling or radio resource control (RRC) signaling.

In some embodiments, the open loop parameter, the closed loop parameter and the PL-RS parameter are common for the plurality of beams, and wherein the TPC commands are distinct for each of the plurality of beams.

In some embodiments, the open loop parameter and the PL-RS parameter are common for the plurality of beams, and wherein the closed loop parameters and the TPC commands are distinct for each of the plurality of beams.

In some embodiments, the PL-RS parameter and the closed loop parameter are common for the plurality of beams, and wherein the open loop parameters and the TPC commands are distinct for each of the plurality of beams.

In some embodiments, the PL-RS parameter is common for the plurality of beams, and wherein the open loop parameters, the closed loop parameters and the TPC commands are distinct for each of the plurality of beams.

In some embodiments, the closed loop parameter and the TPC command are common for the plurality of beams, and wherein the open loop parameters and the PL-RS parameters are distinct for each of the plurality of beams.

In some embodiments, the PL-RS parameter, the closed loop parameter and the TPC command are common for the plurality of beams, and wherein the open loop parameters are distinct for each of the plurality of beams. In an example, the open loop parameter is distinct for each of the plurality of beams and are signaled in medium access control (MAC) control element (CE) signaling, physical layer signaling or radio resource control (RRC) signaling.

In some embodiments, the PL-RS parameters, the closed loop parameters, the open loop parameters and the TPC commands are distinct for each of the plurality of beams.

In some embodiments of method 700, determining an association comprises determining a plurality of powers, wherein each of the plurality of powers is associated with one of the plurality of beams. In an example, a sum of the plurality of powers is not greater than a maximum power. In another example, a sum of the plurality of powers exceeds a maximum power, and the method 700 further includes the step of scaling at least one of the plurality of powers to generate a plurality of scaled powers whose sum is less than the maximum power. In yet another example, scaling at least one of the plurality of powers comprises scaling each of the plurality of powers by an identical scaling factor. In yet another example, scaling is based on at least one of a plurality of parameters, wherein each of the plurality of parameters is applicable to one of the plurality of beams, and wherein the plurality of parameters comprises a required transmit power, a path loss value, a TPC command value, a received target power, the open loop parameters, the closed loop parameters, a beam index, a service type, a number of resource blocks, or a modulation and coding scheme (MCS).

Figure 9:
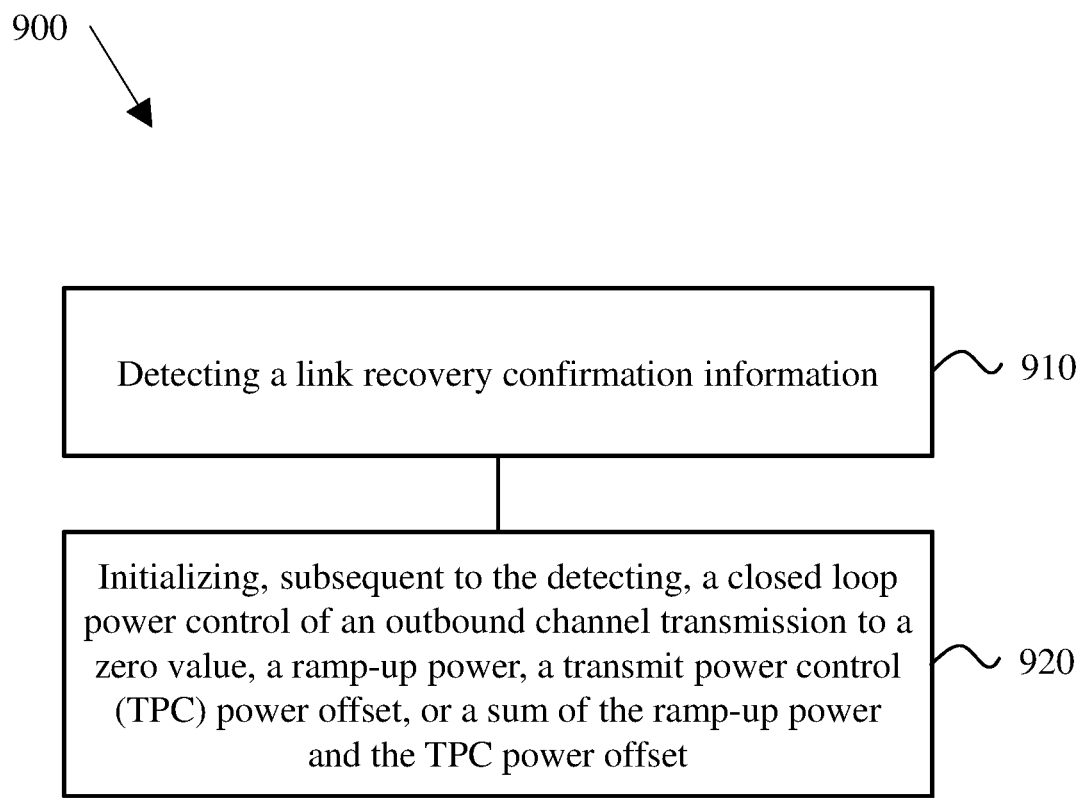
FIG. 9 shows an example of yet another wireless communication method, in accordance with some embodiments of the presently disclosed technology.

FIG. 9 shows an example of a wireless communication method 700 for beam recovery. The method 900 includes, at step 910, detecting a link recovery confirmation information. In some embodiments, detecting the link recovery confirmation information includes detecting a downlink control information (DCI) format comprising a cyclic redundancy check (CRC) scrambled by a cell radio-network temporary identifier (C-RNTI) or a modulation and coding scheme (MCS) C-RNTI in a search space set provided by recoverySearchSpaceId. In other embodiments, it includes determining a last symbol of a first physical downlink control channel (PDCCH) reception in a search space set provided by recoverySearchSpaceId for which a terminal detects a downlink control information (DCI) format comprising a cyclic redundancy check (CRC) scrambled by a cell radio-network temporary identifier (C-RNTI) or a modulation and coding scheme (MCS) C-RNTI, where detecting the link recovery confirmation information occurs K symbols after the last symbols, and wherein K is a non-negative integer.

The method 900 includes, at step 920, initializing, subsequent to the detecting, a closed loop power control of an outbound channel transmission to a zero value, a ramp-up power, a transmit power control (TPC) power offset, or a sum of the ramp-up power and the TPC power offset.

In some embodiments, the outbound channel transmission comprises a physical uplink control channel (PUCCH) transmission, a physical uplink shared channel (PUSCH) transmission or a sounding reference signal (SRS) transmission.

In some embodiments, the outbound channel transmission corresponds to a first outbound channel transmission subsequent to detecting the link recovery confirmation information. In an example, if the first outbound channel transmission is in response to a detection of a DCI format 1_0 or a DCI format 1_1, the TPC power offset is a TPC command value from the DCI format 1_0 or the DCI format 1_1. In another example, if the first outbound channel transmission is scheduled by a DCI format 0_0 or a DCI format 0_1, the TPC power offset is a TPC command value from the DCI format 0_0 or the DCI format 0_1. In yet another example, if the first outbound channel transmission is not in response to a detection of a DCI format 1_0 or a DCI format 1_1, the TPC power offset is zero, or the closed loop power control of the outbound channel transmission is initialized to the zero value or the ramp-up power. In yet another example, if the first outbound channel transmission is configured by ConfiguredGrantConfig, the TPC power offset is zero, or the closed loop power control of the outbound channel transmission is initialized to the zero value or the ramp-up power.

In some embodiments, the outbound channel transmission is in response to a detection of a first of a DCI format 1_0 or a DCI format 1_1 subsequent to detecting the link recovery confirmation information. For example, the TPC power offset is a TPC command value from the DCI format 1_0 or the DCI format 1_1.

In some embodiments, the outbound channel transmission is scheduled by a first of a DCI format 0_0 or a DCI format 0_1 subsequent to detecting the link recovery confirmation information. For example, the TPC power offset is a TPC command value from the DCI format 0_0 or the DCI format 0_1.

In some embodiments, the TPC power offset is a TPC command value from one DCI signal or a sum of a plurality of TPC command values from a plurality of DCI signals within a period. In an example, the format of the plurality of DCI signals corresponds to the outbound channel transmission. In another example, a starting time of the period is based on detecting the link recovery confirmation information or a physical downlink control channel (PDCCH) that contains a DCI used for detecting the link recovery confirmation information. In yet another example, an ending time of the period is based on a starting time of the outbound channel transmission or $K_c$ symbols prior to the starting time of the outbound channel transmission, wherein $K_c$ is a integer. In yet another example, a starting time of the period is not earlier than detecting the link recovery confirmation information.

Implementations for the Disclosed Technology

Figure 10:
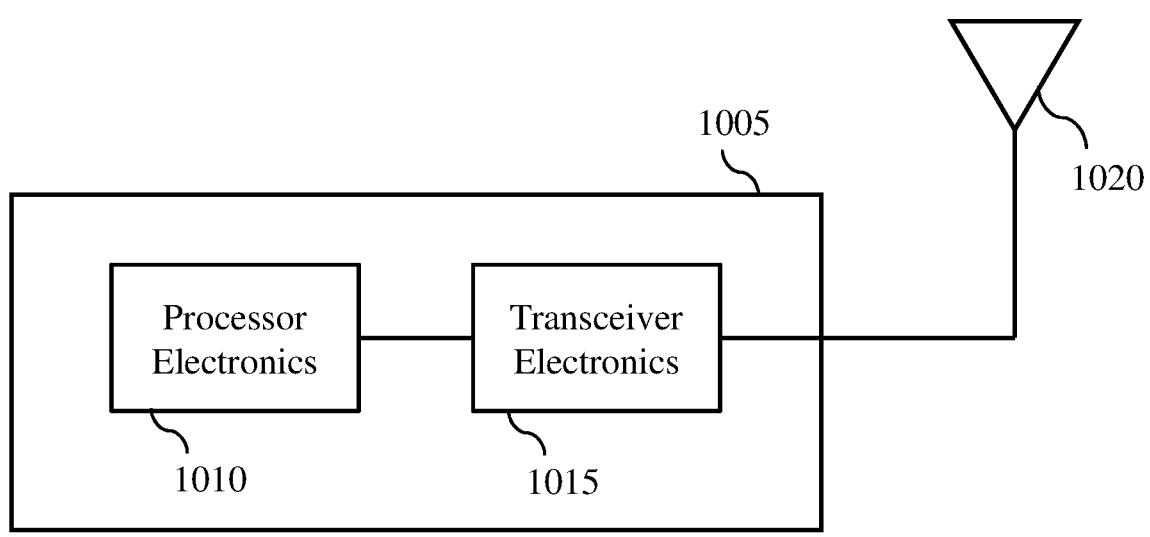
FIG. 10 is a block diagram representation of a portion of an apparatus, in accordance with some embodiments of the presently disclosed technology.

FIG. 10 is a block diagram representation of a portion of an apparatus, in accordance with some embodiments of the presently disclosed technology. An apparatus 1005, such as a base station or a wireless device (or UE), can include processor electronics 1010 such as a microprocessor that implements one or more of the techniques presented in this document. The apparatus 1005 can include transceiver electronics 1015 to send and/or receive wireless signals over one or more communication interfaces such as antenna(s) 1020. The apparatus 1005 can include other communication interfaces for transmitting and receiving data. Apparatus 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the apparatus 1005.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
    detecting a link recovery confirmation information; and
    initializing, subsequent to the detecting, a closed loop power control of a physical uplink control channel (PUCCH) transmission to a sum of a ramp-up power and a transmit power control (TPC) power offset,
    wherein the detecting the link recovery confirmation information comprises detecting a downlink control information (DCI) format comprising a cyclic redundancy check (CRC) scrambled by a cell radio-network temporary identifier (C-RNTI) or a modulation and coding scheme (MCS)C-RNTI in a search space set, and
    wherein the initializing the closed power loop of the PUCCH transmission comprise initializing the closed loop power control of the PUCCH transmission after K symbols from a last symbol of a first physical downlink control channel (PDCCH) reception in the search space set for which a user device detects the DCI format with CRC scrambled by C-RNTI or MCS-C-RNTI.

2. The method of claim 1, wherein the PUCCH transmission corresponds to a first PUCCH transmission subsequent to detecting the link recovery confirmation information.

3. The method of claim 1, wherein the TPC power offset is a TPC command value from a downlink control information (DCI) signal.

4. The method of claim 1, wherein the PUCCH transmission is a first PUCCH transmission after the K symbols from the last symbol of the first PDCCH reception.

5. An apparatus for wireless communication, comprising:
    a processor configured to:
        detect a link recovery confirmation information; and
        initialize, subsequent to the detecting, a closed loop power control of a physical uplink control channel (PUCCH) transmission to a sum of a ramp-up power and a transmit power control (TPC) power offset,
    wherein the processor is further configured to detect the link recovery confirmation information by detecting a downlink control information (DCI) format comprising a cyclic redundancy check (CRC) scrambled by a cell radio-network temporary identifier (C-RNTI) or a modulation and coding scheme (MCS)C-RNTI in a search space set, and
    wherein the processor is further configured to initialize the closed loop power control of the PUCCH transmission, after K symbols from a last symbol of a first physical downlink control channel (PDCCH) reception in the search space set for which the apparatus detects the DCI format with CRC scrambled by C-RNTI or MCS-C-RNTI.

6. The apparatus of claim 5, wherein the PUCCH transmission corresponds to a first PUCCH transmission subsequent to detecting the link recovery confirmation information.

7. The apparatus of claim 5, wherein the TPC power offset is a TPC command value from a downlink control information (DCI) signal.

8. The apparatus of claim 5, wherein the PUCCH transmission is a first PUCCH transmission after the K symbols from the last symbol of the first PDCCH reception.

9. A non-transitory computer-readable storage medium having instructions stored thereupon for wireless communication, comprising:
- instructions for detecting a link recovery confirmation information; and
- instructions for initializing, subsequent to the detecting, a closed loop power control of a physical uplink control channel (PUCCH) transmission to a sum of a ramp-up power and a transmit power control (TPC) power offset,
- wherein the instructions for detecting the link recovery confirmation information comprises instructions for detecting a downlink control information (DCI) format comprising a cyclic redundancy check (CRC) scrambled by a cell radio-network temporary identifier (C-RNTI) or a modulation and coding scheme (MCS) C-RNTI in a search space set, and
- wherein the instructions for initializing the closed power loop of the PUCCH transmission comprise instructions for initializing the closed loop power control of the PUCCH transmission after K symbols from a last symbol of a first physical downlink control channel (PDCCH) reception in the search space set for which a user device detects the DCI format with CRC scrambled by C-RNTI or MCS-C-RNTI.

10. The storage medium of claim 9, wherein the PUCCH transmission corresponds to a first PUCCH transmission subsequent to detecting the link recovery confirmation information.

11. The storage medium of claim 9, wherein the TPC power offset is a TPC command value from a downlink control information (DCI) signal.

12. The storage medium of claim 9, wherein the PUCCH transmission is a first PUCCH transmission after the K symbols from the last symbol of the first PDCCH reception.

* * * * *